UNITED STATES PATENT OFFICE.

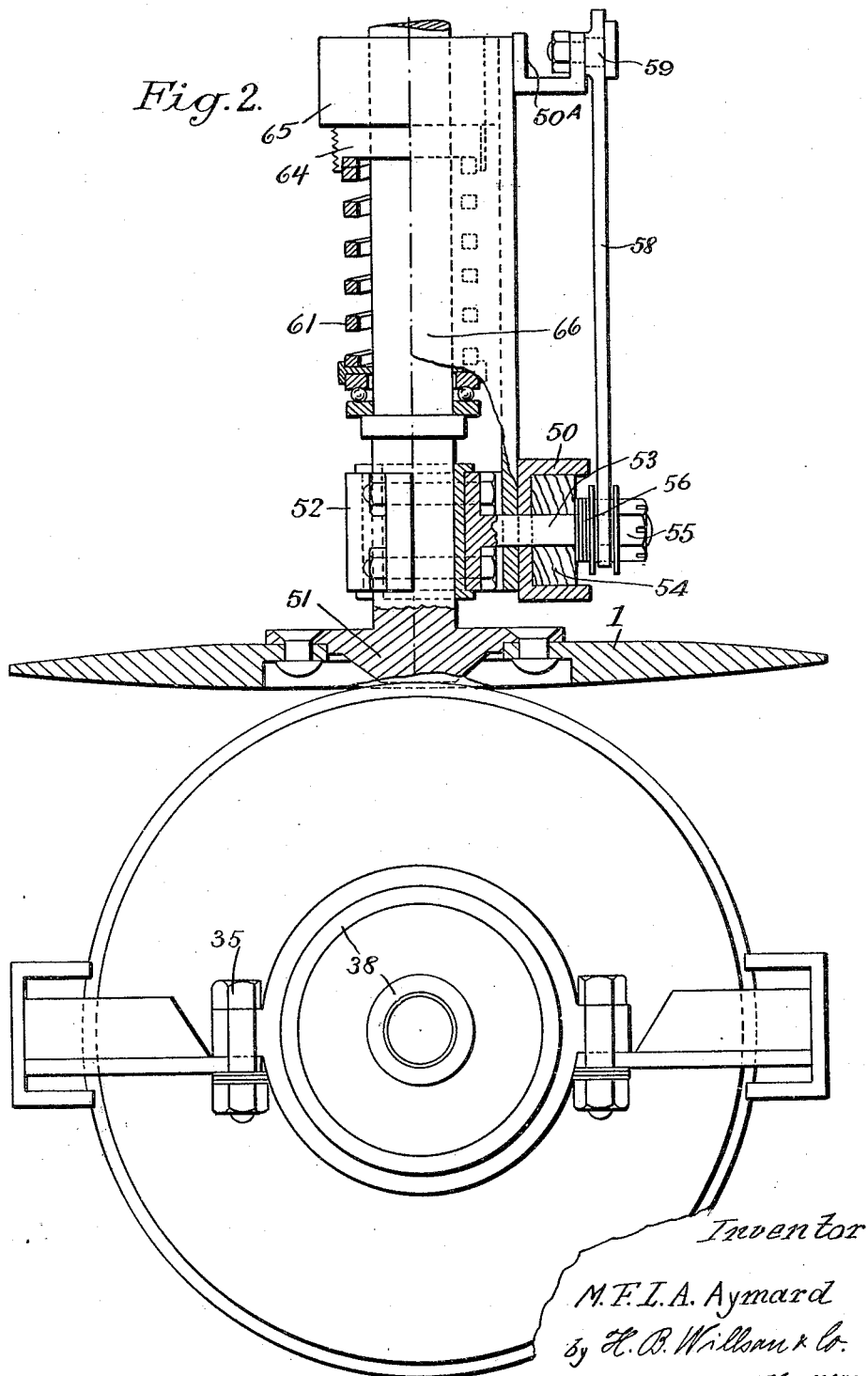

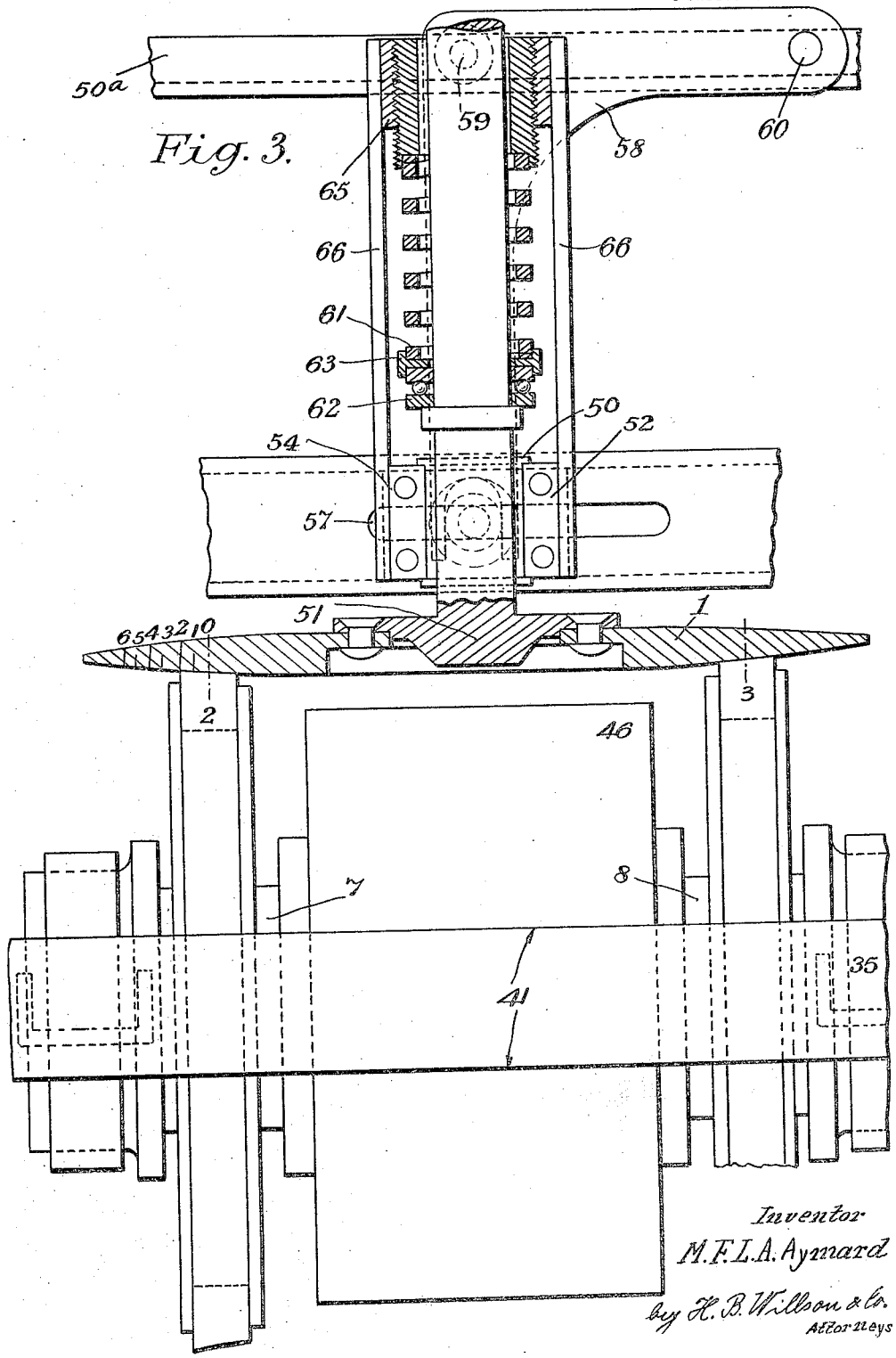

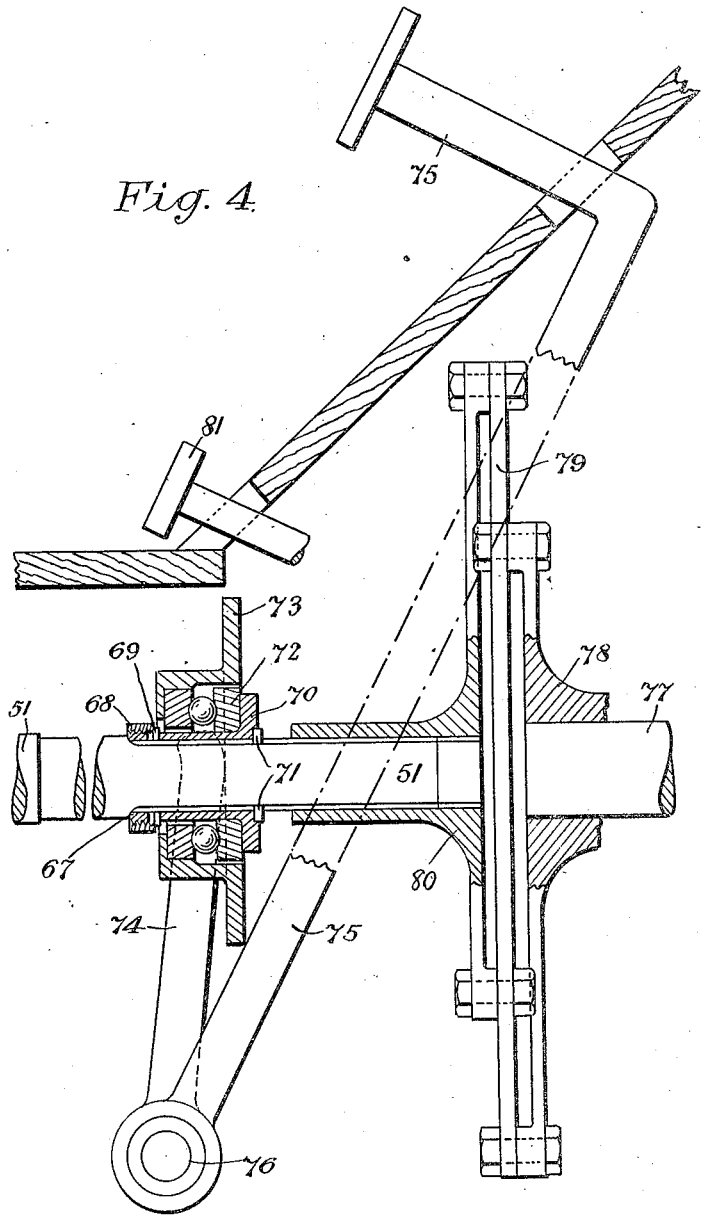

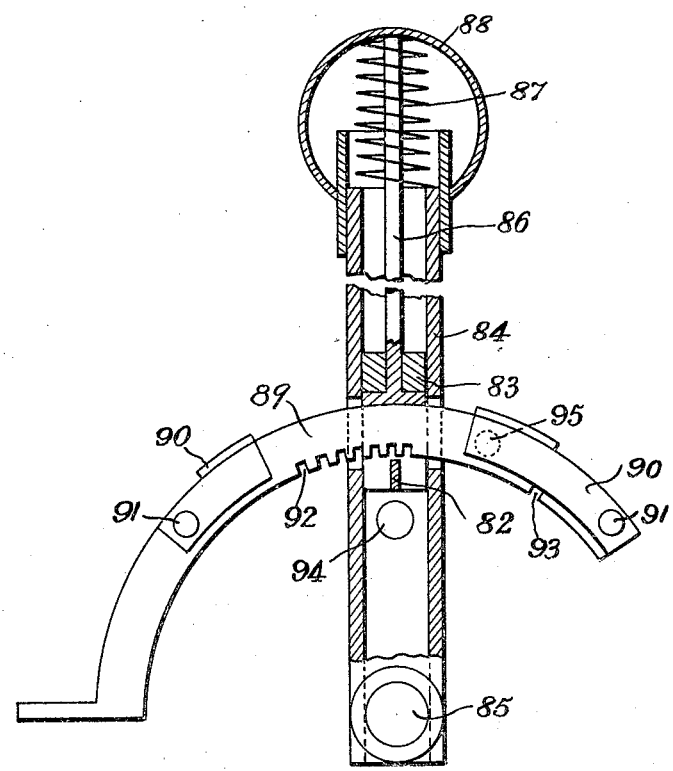

MALCOLM FOERSTER LAMBE AYMÉ AYMARD, OF COLCHESTER, ENGLAND.

VARIABLE-SPEED GEARING.

1,423,067.  Specification of Letters Patent.  Patented July 18, 1922.

Application filed November 4, 1921. Serial No. 512,893.

*To all whom it may concern:*

Be it known that I, MALCOLM FOERSTER LAMBE AYMÉ AYMARD, of West Lodge, Colchester, Essex, England, (whose post-office address is West Lodge, Colchester, Essex, England), have invented certain new and useful Improvements in Variable - Speed Gearing, of which the following is a specification.

This invention for improvements in or relating to variable speed gearing has for its object an improved construction enabling an infinitely variable range of speed reduction or multiplication in either direction to be obtained with greater efficiency than heretofore.

According to the present invention the improved variable speed gear comprises two independently rotatable members operatively connected with a driven member or members by differential gearing, both of which members operatively engage a common driver member and are together adjustable in relation thereto in such manner that the distances of the points of engagement of the two rotatable members from the centre of rotation of the driver are variable for the purpose of changing the speed and direction of rotation of the driven member or members.

In one practical form of the invention as applied to the transmission gear of a motor road vehicle, the improved variable speed gear is preferably incorporated with the usual differential gear (bevel or straight) located in the back axle and comprises two independently rotatable friction gears or crown wheels mounted to turn about and operatively connected with the floating cage of the usual differential gear by differential pinions mounted on the said cage, that is to say the two rotatable rings or outer crown wheels are connected by means of differential gearing with the driving member of the usual differential gear of the back axle. Both the outer crown wheels are formed or provided with suitable circumferential friction surfaces which operatively engage a common rotatable friction drive plate, the latter being laterally adjustable in relation to the outer crown wheels in order to vary the radii of the points of engagement of the two wheels with the drive plate.

Though the drive plate may take the form of a flat disc, I prefer to employ a plate formed as a segment of a sphere and carried at the free end of a shaft whose opposite end is driven through a universal joint, the length of the shaft approximately corresponding to the radius of curvature of the spherical surface.

Then when the centre of rotation of the spherical plate is dead opposite the centre plane between the two friction rings, the one crown wheel will rotate at the same rate as, but in opposite direction to the other crown wheel, with the result that the outer pinions will merely rotate around their shafts and not translate the cage of the inner differential gear. By moving the centre of rotation of the spherical disc across the two friction rings a greater movement will be given to one outer crown wheel and a lesser movement to the other crown wheel with the result that the outer pinions will both rotate in themselves and translate the cage of the inner differential gear and so drive the inner crown wheels of the ordinary differential gear in the usual way. Throwing the centre of rotation of the spherical friction plate, the other way across the friction rings has the effect of reversing the movement of the driven axles.

The invention is hereinafter more particularly described with reference to the accompanying drawings which illustrate a preferred form of construction as applied to a motor road vehicle.

Fig. 2 is a vertical section taken on the longitudinal centre line of the vehicle.

Fig. 3 is a sectional plan of the same.

Figure 1:
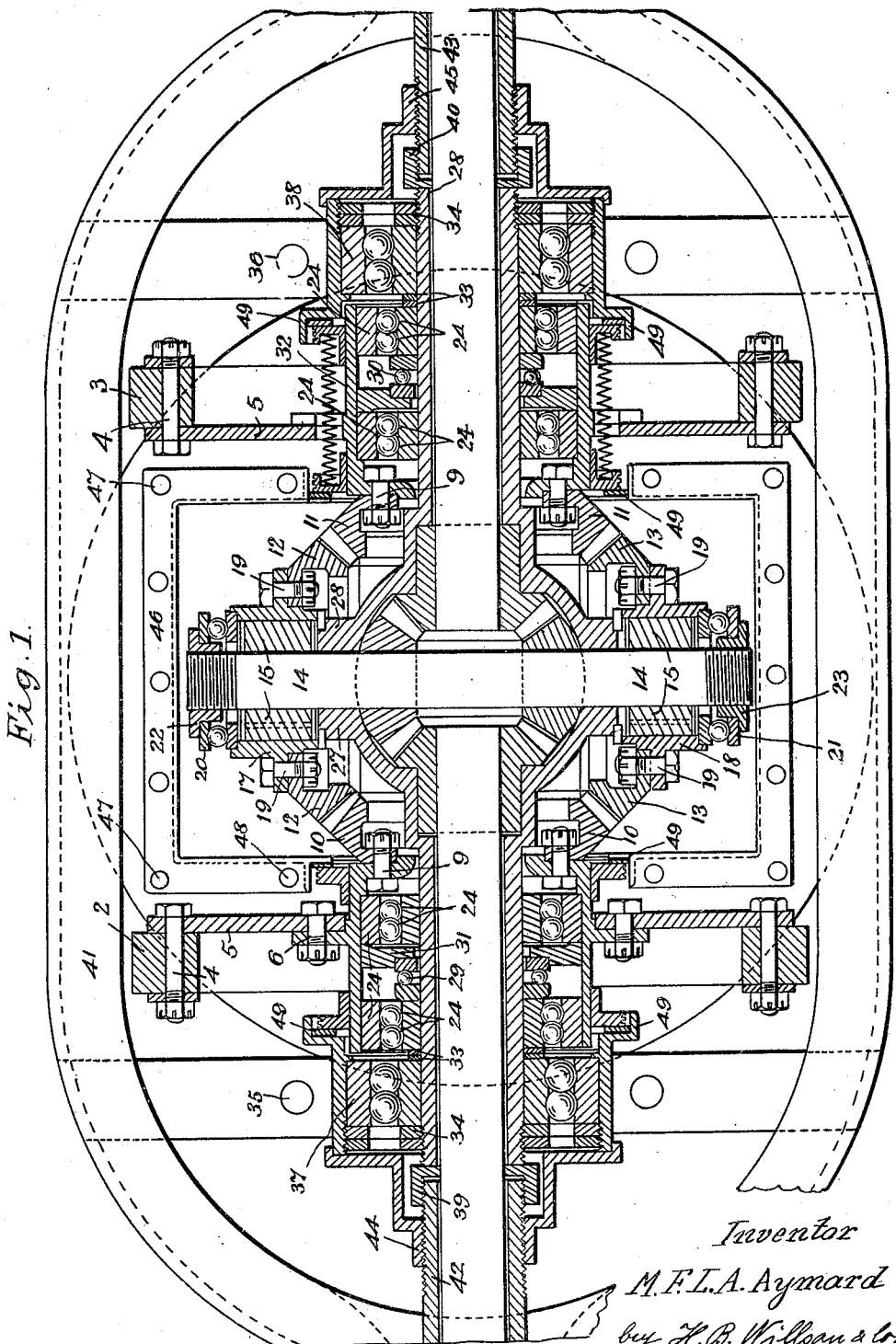
Fig. 1 is a vertical sectional elevation of the differential or driving axle.

Figs. 4 and 5 diagrammatic views partly in section illustrating pedal control and hand control mechanisms respectively.

Referring to these drawings it will be seen that a friction plate 1 drives the friction rings 2 and 3 in opposite direction, said rings being secured to bevel pinions 10, 11, which gear with translating pinions 12 and 13, mounted on the cage of the differential proper. The movement of translation and rotation of the pinions 12, 13 about the spindle 14 and bearing rollers 15, 16, causes the spindle 14 with cage halves 27, 28 and inner differentials and jack shafts to rotate at road speeds.

The rings 2 and 3 and bevel wheels 10, 11 are carried by sleeves 7 and 8 on radial races 24 and thrust races 29, 30. Oil is retained by split case 46 which is fixed to differential case 41, oil tightness being maintained between sleeves 7 and 8 and case 46 by springs and push sleeves bearing against hardened rings 49 each of which beds itself on a felt washer.

Cage halves 27, 28 are carried by radial races 37, 38 enclosed in sleeves held in divided clamps by bolts 35, 36. The sleeves retain oil by push flanges and hardened washers on felt beds on their inner or flanged ends and engage caps 44, 45 on their outer ends. Unbalanced side thrusts are taken by adjustable location cap washers 39, 40, the main pinion reactions being contained within the cage halves 27, 28, by thrust races 29, 30 and screw rings 34; the reactions of the pinions 12, 13 being taken by spindle 14 and thrust races 20, 21.

Axle tubes 42, 43 secured to the outer case 41 carry on their outer ends usual road wheels and hubs, on their inner ends caps 44, 45, 39, 40, making the wheels and both differential gears one complete self oiling splash fed system.

Friction plate 1 is secured on the forged inverted head of a Cardan shaft 51, whose end rotates in a plain split bearing 52 slidably secured by stud 53, sliding block 54, nut and collar 55 and spring washer 56 upon a transverse channel member 50.

The forward end of shaft 51 is connected through a tubular extension with a universal joint carried upon an extension of the crank shaft, and is capable of sliding longitudinally on castellations of that extension.

A slot 57 in the channel member 50 allows lateral movement of the stud 53 which is brought about by actuating a forked lever 58 working on fulcrum 59 on a channel member 50ᵃ the control rod being attached at 60.

The friction plate 1 is maintained in contact with rings 2 and 3 by a spring 61, thrust race 62 and distance piece 63 held by a screw tube 64 inside screw ring 65. Ring 65 is welded to a channel member 66 projecting forwardly from the plain bearing 52 in such a manner as to make the spring self aligning with its shaft 51.

The shaft 51 is reduced and castellated at the engine end to take abutment collar 67, screw ring 68, washer 69, collar 70 and split thrust ring 71 which latter springs into an interruption in the castellations.

Upon collar 70 is seated thrust race 72 and trunnioned cap 73, engaged by a fork lever 74 worked by pedal 75 about center 76. The crank shaft 77 has keyed to it one spider 78 universally connected by a flexible medium 79 with a second spider 80 which is castelled right through to allow shaft 51 to slide therein.

The two channelled cross members 50 and 50ᵃ referred to above are preferably connected at their ends to radius or torque rods which extend between the ends of the back axle and pivot pins located adjacent the universal joint at the forward end of the shaft 51.

Thus the pedal 75 by fork 74 withdraws shaft 51 and plate 1 from rings 2 and 3. A catch (not shown) worked by heel stop 81, which is not directly under pedal 75 can be actuated to hold back pedal 75, and thus plate 1 from rings 2 and 3 for a temporary disengagement, pressure upon pedal 75 being arranged to automatically release this catch.

The gear lever 84 works about centre 85, and the pin 94 (Fig. 5) is suitably connected to operating crank 60 (Fig. 3). Gear lever catch 82 in plunger 83 inside tube 84 engages quadrant 89 and is operated by rod 86, spring 87 and knob 88.

Quadrant 89 carries stops 90 hinged on pins 91 which guard reverse slot 92 and disengagement slot 93. When the gear lever is in the disengagement position a padlock inserted in hole 93 prevents tampering with the gear.

Normally the friction rings 2 and 3 engage the friction plate 1 at points at equal radius in such manner that no real drive is transmitted to the live axles but upon operating the gear lever 84 the friction plate 1 and the shaft 51 will be moved in a lateral direction, and in consequence, the rings 2 and 3 will be driven at different speeds resulting in a movement being imparted to the axles. The direction of rotation imparted is of course dependent upon the direction in which the plate 1 is moved with regard to the centre line and the speed of rotation varies with the degree of movement. That is to say in the example shown in Fig. 3 by moving the plate 1 to the right through angular displacement indicated by I, II, III, IV, V, VI, various increasing ratios of forward drive are obtainable whilst a small movement to the left will bring about a reverse drive. The quadrant of the gear lever 84 is suitably notched in order that such movement may be effected readily and easily.

As will be understood the construction is such as to allow very high peripheral speeds in the friction surfaces with quite low road speeds and high torque is therefore obtainable for starting. The spur pinions employed are enclosed and well lubricated whilst the friction surfaces are protected from oil system.

The improved gear is applicable to motor road vehicles, air-craft, marine work, hoists, mine winding gear and for other purposes requiring either a constant final speed with varying torque or a constant engine or driving speed with variable final speed.

I claim:—

1. In a structure of the character described, a drive shaft, a friction disk carried thereby, a driving axle including separate end sections, casings for the axle sections, a differential housing, pinions carried by the inner ends of the axle sections, a shell receiving said pinions and having side tubes receiving the inner end portions of the axle sections, a pin extending radially through the shell between the pinions, pinions carried by the pin within the shell and extending between and meshing with the pinions of the axle sections, collars rotatable upon the sleeves upon opposite sides of the differential housing, friction rings received about the collars and engaging the friction disk, beveled gears carried by the collars within the differential housing, and beveled gears carried by the pin externally of the shell and within the housing and extending between and meshing with the beveled gears of the collars.

2. In a structure of the character described, a drive shaft, a friction disk carried thereby, a driving axle having separate end sections, a differential housing having side openings receiving the inner end portions of the axle sections, casings for the axle sections, sleeves upon the axle sections extending from the axle casings into the differential housing and having inner end portions forming a shell within the housing, a pin extending through the shell between the axle sections, intermeshing pinions carried by the pin and axle sections within the shell, collars rotatable upon the sleeves upon opposite sides of said housing, friction rings secured about said collars and engaging the friction disk, and intermeshing beveled gears carried by the collars and end portions of the pin within the differential housing.

3. The structure of claim 2 and abutment disks carried by the axle casings, bearing cups between the abutment disks and collars and having outstanding annular flanges, bearing elements in the cups and collars, packing rings upon the collars engaging the flanges and sides of the differential housing, and spring means holding the packing rings in an operative position.

In testimony whereof he has affixed his signature.

MALCOLM FOERSTER LAMBE AYMÉ AYMARD.